United States Patent [19]

Maeda

[11] Patent Number: 5,032,465
[45] Date of Patent: Jul. 16, 1991

[54] MAGNETO-OPTICAL RECORDING MEDIUM AND THE RECORDING METHOD THEREFOR

[75] Inventor: Atsushi Maeda, Sanyo Denki Takezono Shataku-26, Takezono 2-16-12, Tsukuba-shi, Ibaraki-ken, Japan

[73] Assignees: Research Development Corp., Tokyo; Atsushi Maeda, Ibaraki, both of Japan

[21] Appl. No.: 438,590

[22] Filed: Nov. 17, 1989

[30] Foreign Application Priority Data

Nov. 18, 1988 [JP] Japan ................................ 63-290113

[51] Int. Cl.$^5$ ............................................ H01F 10/12
[52] U.S. Cl. ...................................... 428/611; 428/635
[58] Field of Search ........................ 428/611, 635, 678

[56] References Cited

U.S. PATENT DOCUMENTS 4,727,005 2/1988 Sato ...................................... 428/678

Primary Examiner—R. Dean
Assistant Examiner—George Wyszomierski
Attorney, Agent, or Firm—Darby & Darby

[57] ABSTRACT

Laser light is irradiated on a multilayered magnetic thin film having a spin-glass characteristic consisting of a rare-earth metal and a conductive material, the film being heated to a predetermined temperature below the spin-glass transition temperature when recording information and heated to a temperature above the spin-glass transition temperature when erasing the information.

4 Claims, 11 Drawing Sheets

MAGNETO-OPTICAL RECORDING MEDIUM AND THE RECORDING METHOD THEREFOR

FIELD OF THE INVENTION

The invention relates to a recordable and erasable magneto-optical medium and the recording method therefor.

BACKGROUND OF THE INVENTION

A well known method of magnetic recording on a magnetic medium is carried out by irradiating light locally onto a region of the magnetic recording medium in a magnetic field so that the heat energy generated by the irradiation changes the magnetic state of the region. This method has been known to provide a high-density recording promoted by the laser light.

However, since most conventional magnetic media of this kind are ferromagnetic, the above mentioned method has a drawback that the magnetic spins are oriented in parallel with the surface of the medium due to the internal magnetic field, preventing high density recording. On the other hand, TbFeCo alloy, which is an only commercially available perpendicular-magnetic recording medium for such magneto-optical recording, has disadvantages that it is not only expensive but also easily oxidized.

BRIEF SUMMARY OF THE INVENTION

The invention is directed to solve the above mentioned problems. Namely an object of the invention is to provide a new magnetic recording medium and the recording method therefor.

Firstly, the invention is characterized in that it utilizes as a magneto-optical recording medium a magnetic thin film consisting of alternate layers of a rare-earth metal and a conductive material, and having a spin-glass characteristic. Secondly, the invention is characterized in that the thin film alloy or the material having said multilayer structure and spin-glass characteristic is heated during recording information to a temperature below the peak temperature and then cooled down to a room temperature, while it is heated to a temperature above the peak temperature during erasing the information and then cooled down to a room temperature.

This makes it possible to provide an economical yet high-density magneto-optical recording medium which has a perpendicular-magnetization characteristic and can be recorded/erased by laser light.

DETAILED DESCRIPTION OF THE PREFERRED EMBODIMENT

Figure 1:
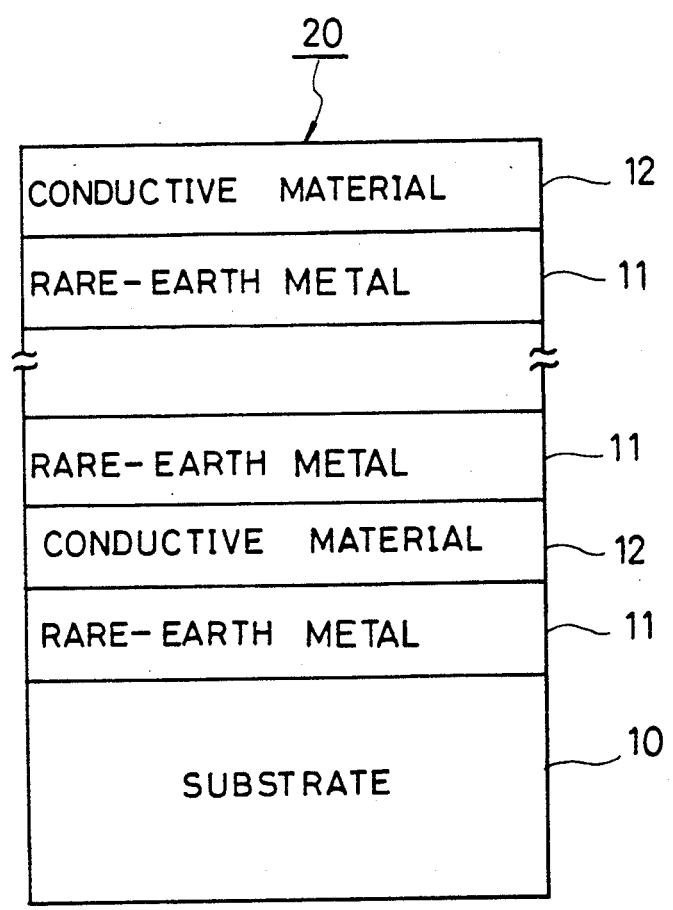
FIG. 1 is a brief illustration of the cross section of the magnetic thin film consisting of a rare-earth and a conductive material embodying the invention.

By depositing on a substrate alternate layers of a rare-earth metal 11 and a conductive material 12 each having thickness of 3-5 atoms as shown in FIG. 1 to form a multilayer structure, a magnetic material 20 may be obtained having a spin-glass characteristic due to interlayer interactions between the magnetic spins of the rare-earth metal 11 layers mediated by the conduction electrons.

Figure 2:
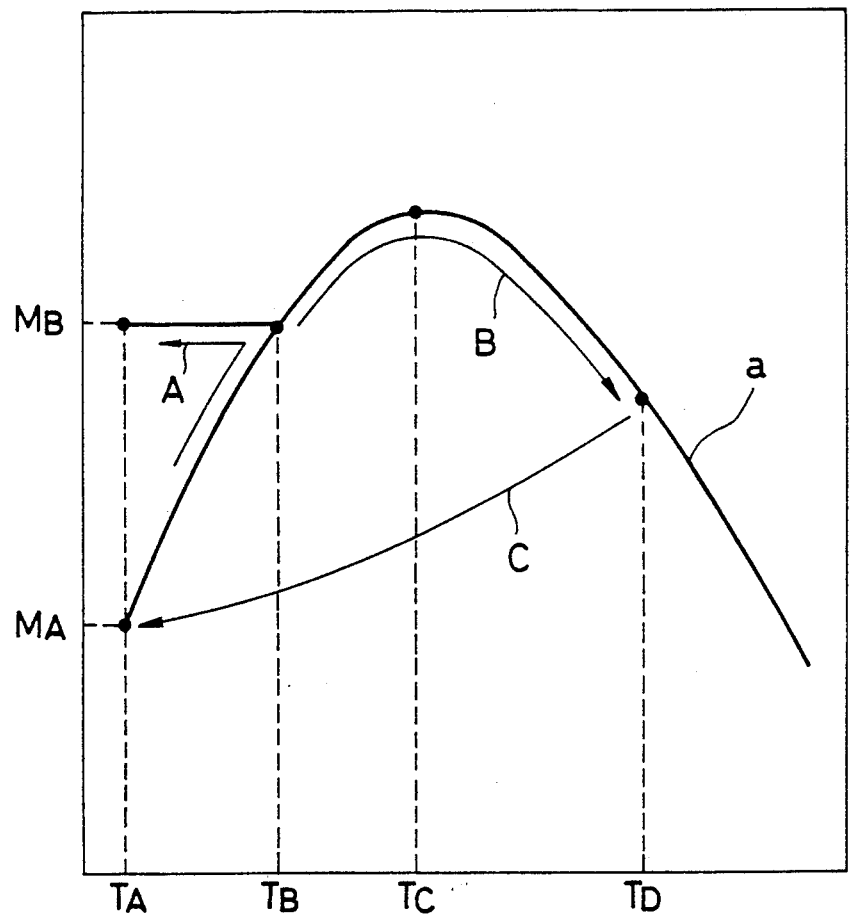
FIG. 2 shows the spin-glass characteristic of the film material shown in FIG. 1.
Figure 3:
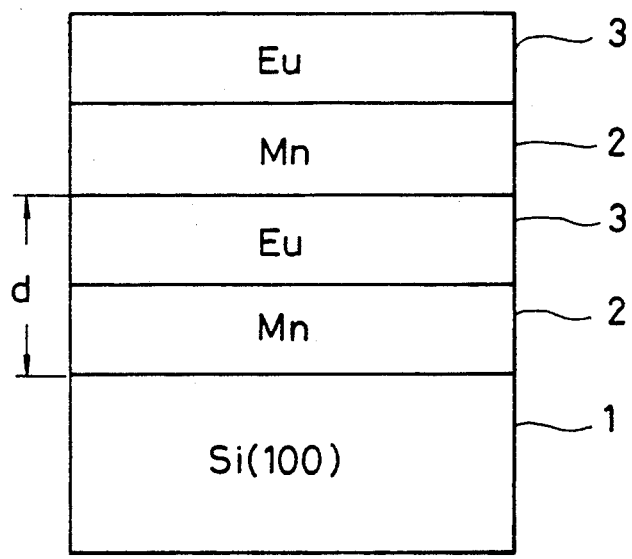
FIG. 3 is a brief illustration of the cross section of an exemplary Eu-Mn magnetic thin film.

The above mentioned spin-glass characteristic refers to a magnetization-temperature relationship "a" as shown in FIG. 2, which is a fairly new magnetic phenomenon found in 1972 (See Physical Review B6, 4220 (1972)). Since then, quite a few experiment have been made mainly from a fundamental physical point of interest, and presently about 20 kinds of magnetic materials having such spin-glass characteristics are known. All of these magnetic materials are alloys. This spin-glass characteristic, like other magnetic ordering, has not been completely understood, leaving some of the essential problems unsolved. For example, a question whether or not the spin-glass characteristic arises from a phase transition has not been answered.

No example of a recording medium has been reported utilizing a magnetic material having the spin-glass characteristic. It is because the characteristic has been believed to be reversible. The inventor of this application has found from a detailed study of such magnetic material having the spin-glass characteristic that, as shown in FIG. 2, the material heated to a certain temperature $T_B$ below temperature $T_C$ at which the magnetization reaches its peak value, will retain its magnetization $M_B$ even after it is brought back to a room temperature $T_A$, and that the material restores magnetization $M_A$ if it is brought back to a temperature $T_A$ after it is heated to a temperature $T_D$ above the peak temperature $T_C$. The invention takes advantage of this phenomenon in utilizing the magnetic material having this spin-glass characteristic as a recording medium. Since such magnetic material having the spin-glass characteristic serves generally as a perpendicular-recording medium, and is recordable and erasable by laser light, the material may provide a high-density, large-capacity recording medium.

EXAMPLE

Figure 4:
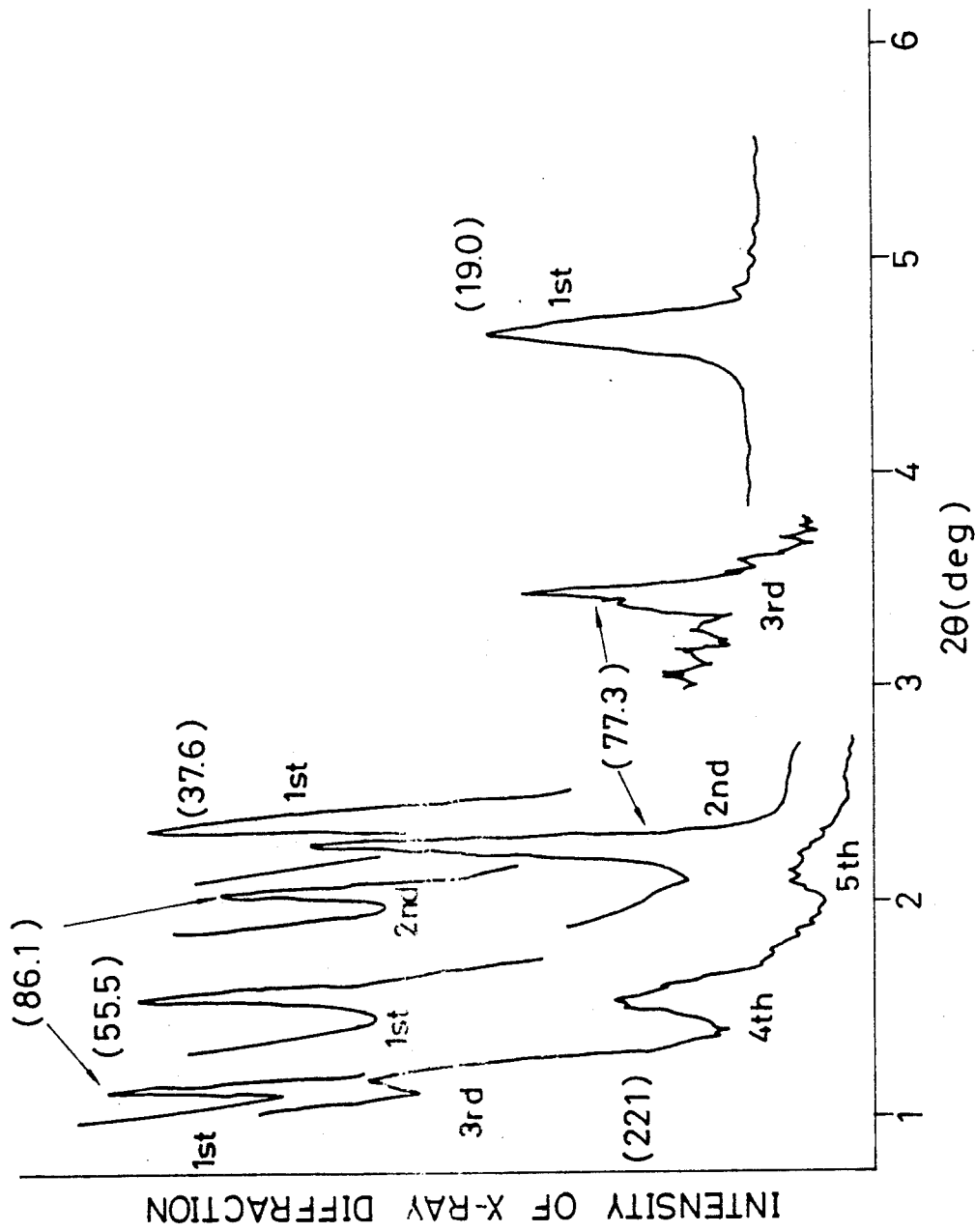
FIG. 4 shows the small-angle X-ray diffraction pattern for an exemplary Eu-Mn magnetic thin film.

By repeating molecular beam epitaxial growth of a Mn (manganese) layer 2 and a subsequent Eu (europium) layer 3, on a Si (silicon) substratum 1, a multilayer thin film of Mn layers 2 and Eu-layers 3 is formed. Small angle X-ray diffraction observation of this multilayer thin film gives the results shown in FIG. 4. In FIG. 4, the ordinate is the intensity of the diffracted X ray and the abscissa is the incident angle $\theta$ times 2 of the X-ray irradiated upon said thin film. Values in the parentheses indicate the thickness of one Mn-layer 2 plus one Eu-layers 3 in one cycle on the multilayers. Small angle X-ray diffraction is performed by irradiating X-ray beam onto the surface of the multilayer thin film at a given incident angle, and by measuring the intensities of the reflected X-rays into various diffraction angles. As the incident angle is varied, a diffraction peak appears. The existence of this diffraction peak implies the existence of the interfaces between the multilayers. It has been known that the diffraction peak becomes sharper as the interfaces becomes more distinctive. The following equation holds for the diffraction peak.

$$2d \sin \theta = n\lambda \qquad \ldots (1)$$

where $\lambda$ is the wave length of the X-ray, and n is an integer. Given the incident angle $\theta$ of the X-ray at the time of the peak diffraction, one-cycle thickness d may be found from Eq (1).

Figure 5:
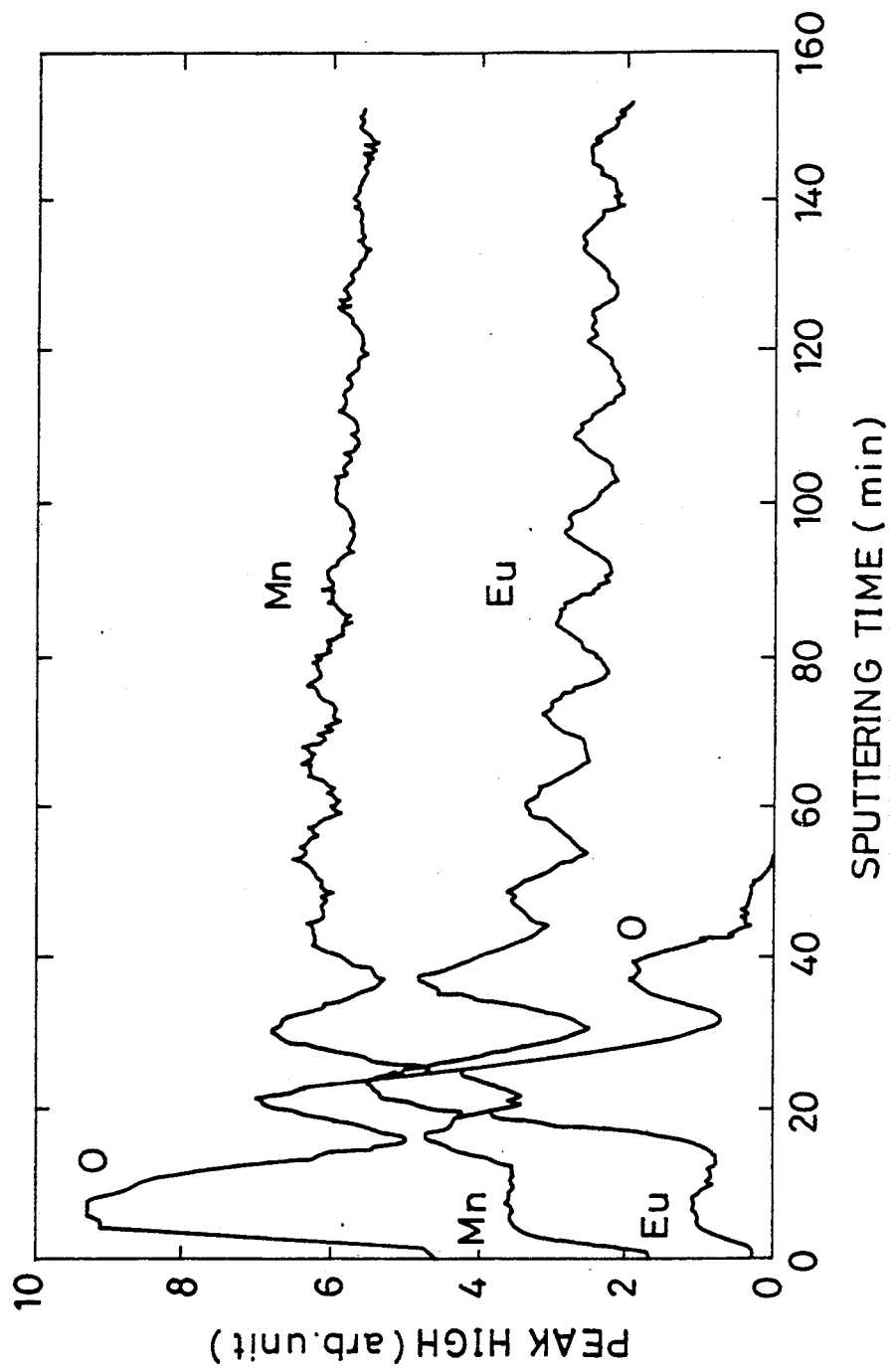
FIG. 5 shows the Auger-electron spectroscopic depth-profile for an exemplary Eu-Mn magnetic thin film.

Auger electron spectroscopy of the above magnetic thin film of stacked layers yields the depth profile as shown in FIG. 5. The result shows that the crests (maxima) and the trough (minima) of the Eu and Mn signal curves coincide, leading us to the conclusion that the interfaces are well defined.

Thus, it is confirmed from FIGS. 4 and 5 that the interfaces of the stacked layers of said thin film are spaced apart by several atomic orders and free from perturbations.

Figure 6:
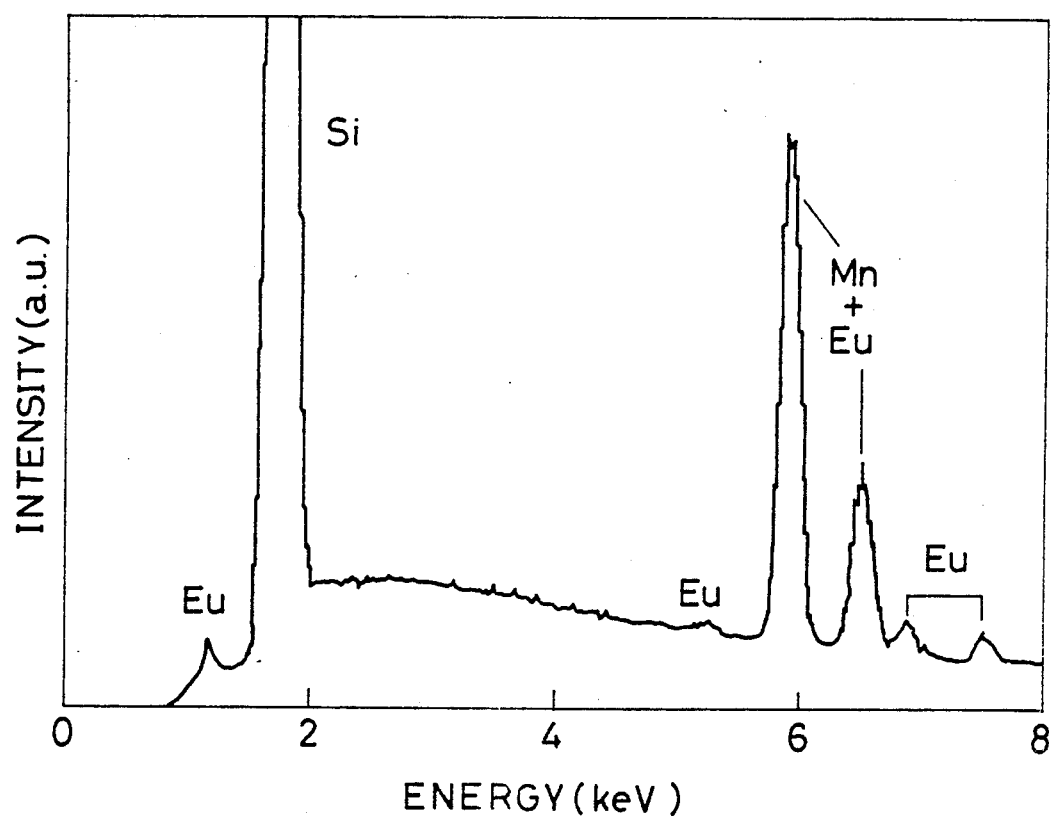
FIG. 6 is the result of the elementary analysis by means of energy dispersion X-ray spectroscopy for an exemplary Eu-Mn magnetic thin film.

Next, the investigation of the above thin multilayer film by energy dispersion X-ray spectroscopy gives the result as shown in FIG. 6. As seen from this figure, only those signals for the silicon of the substratum, Eu, and Mn were detected, indicating the absence of impurities.

Figure 7:
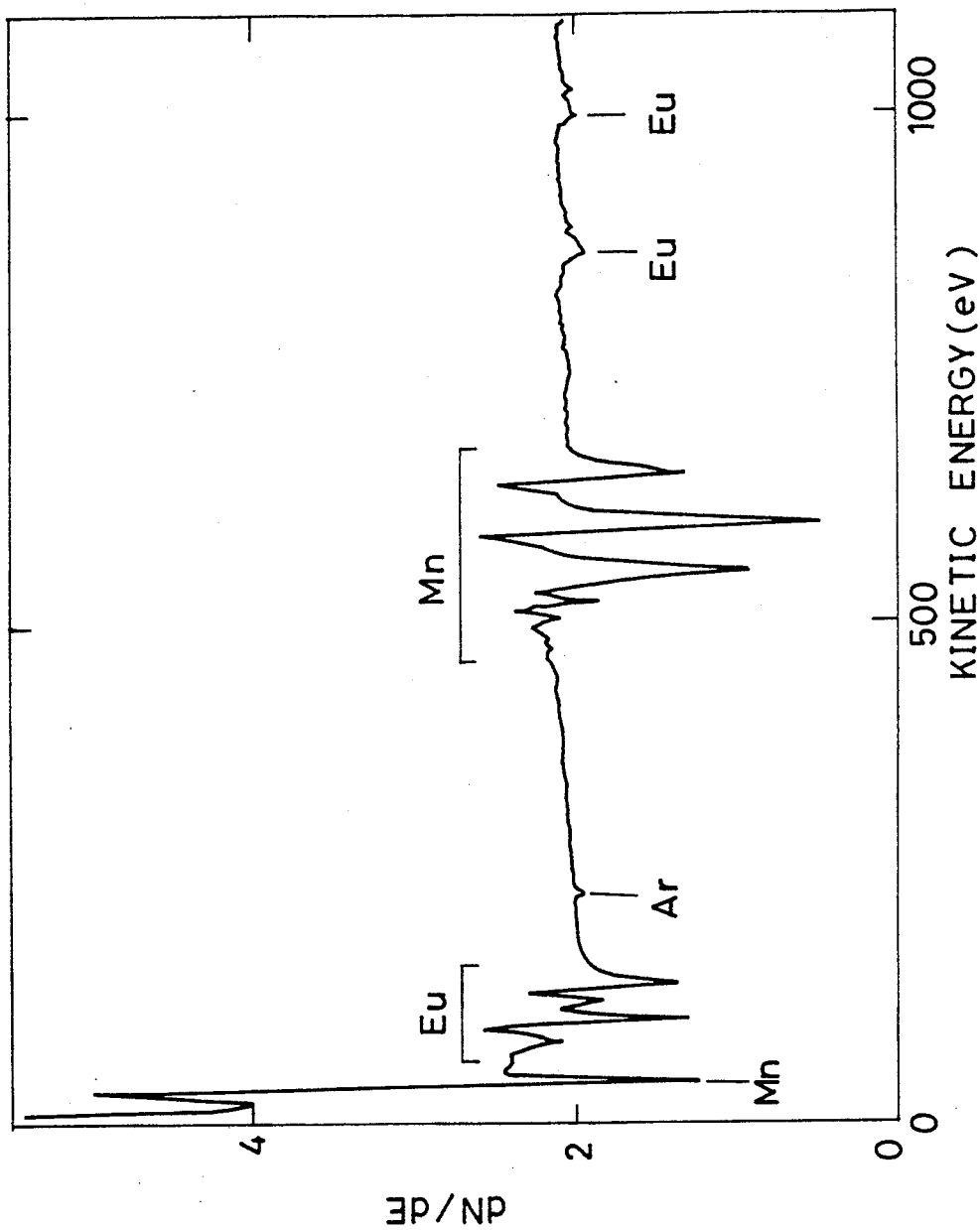
FIG. 7 is the result of the composition analysis by means of Auger electron spectroscopy for an exemplary Eu-Mn magnetic thin film.

The elementary analysis of said multilayer thin film by means of the Auger electron spectroscopy is shown in FIG. 7, in which the responses observed are only those for Ar gas used in the analysis, Eu, and Mn, also indicating the absence of impurities.

Figure 8:
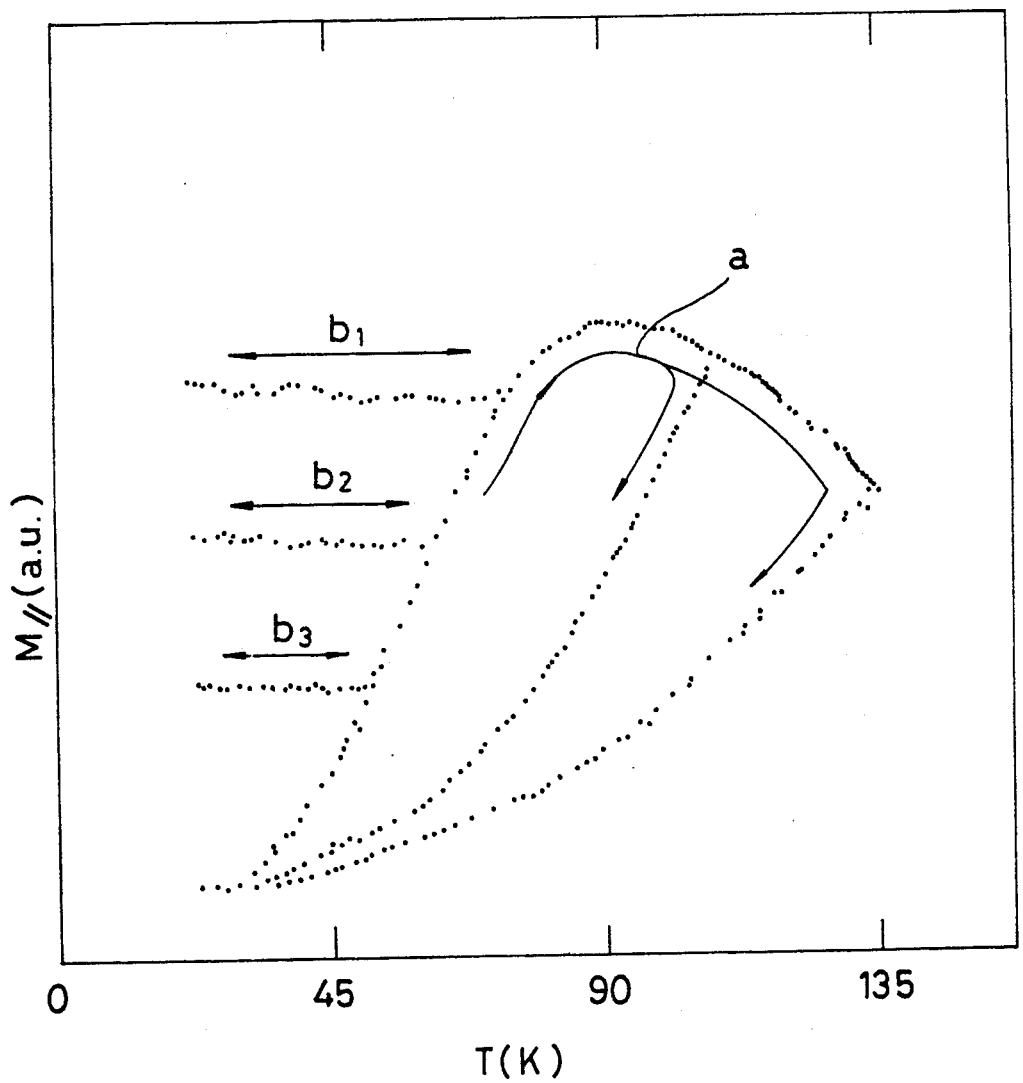
FIG. 8 shows a reversible magneto-optical recording characteristic of an exemplary Eu-Mn magnetic thin film.

Series of data depicting the spin-glass characteristic of said multilayer thin film may be obtained as shown in FIG. 8 from the measurement of the magnetization of the film as it is heated under a constant magnetic field after it was cooled under zero magnetic field. It has been found that this multilayer thin film has a perpendicular-magnetization property. Further, it has been found that, as the magnetic multilayer thin film is first cooled under zero magnetic field and then heated by laser light under a constant magnetic field to an arbitrary temperature below the peak temperature and brought back to the initial temperature, the magnetic thin film retains the magnetization induced at the time of stopping the laser light heating, which depends on the temperature at that time, as shown in by the data b1-b3 in the figure. It has been also confirmed that the magnetization of the magnetic thin film restores its initial magnetization if the film is heated up above the peak temperature by raising the power of the laser light and then stopping laser heating to bring the thin film back to its initial temperature, as shown by the curve "a" in the same figure. Incidentally, the ordinate represent the magnetization parallel to the magnetic thin film, and abscissa the absolute temperature.

Figure 9:
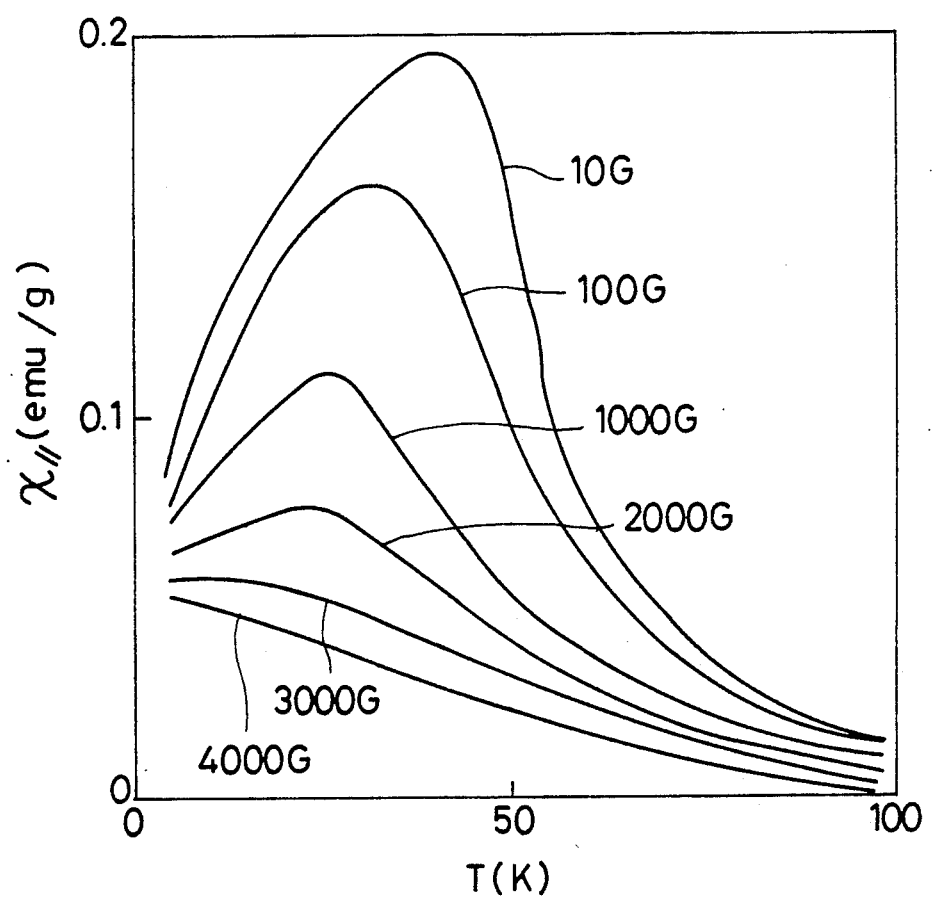
FIG. 9 is a graphical representation of the spin-glass characteristic of an exemplary Eu-Mn magnetic thin film, showing its dependency on an applied magnetic field.

The spin-glass characteristic of said magnetic thin film varies with the magnetization as shown in FIG. 9. The ordinate represents the magnetization in unit of emu per unit gram, and the abscissa, the absolute temperature, the parameter being the intensity of the magnetic field (in Gauss) to be applied onto said magnetic thin film. It is seen from this result that the spin-glass characteristic of said magnetic thin film is intensified as the magnetizing field becomes weaker.

Figure 10:
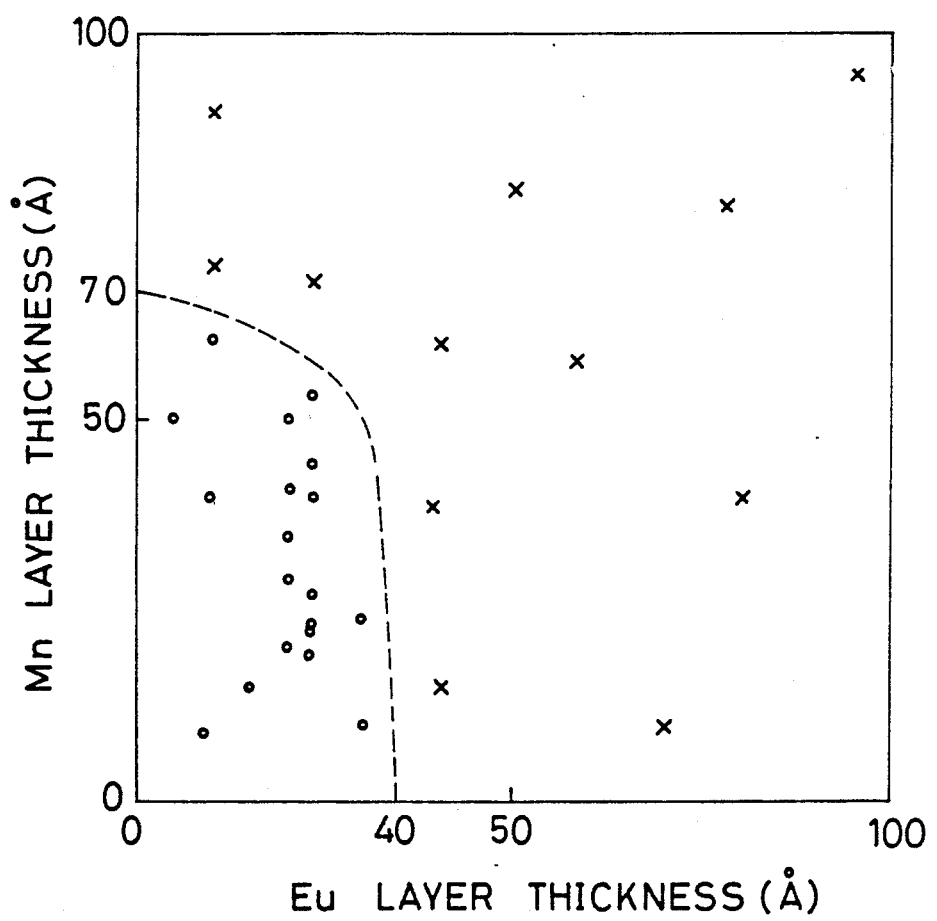
FIG. 10 shows the region of the Eu- and Mn-layer thickness where an Eu-Mn magnetic thin film exhibits a spin-glass characteristic.
Figure 11:
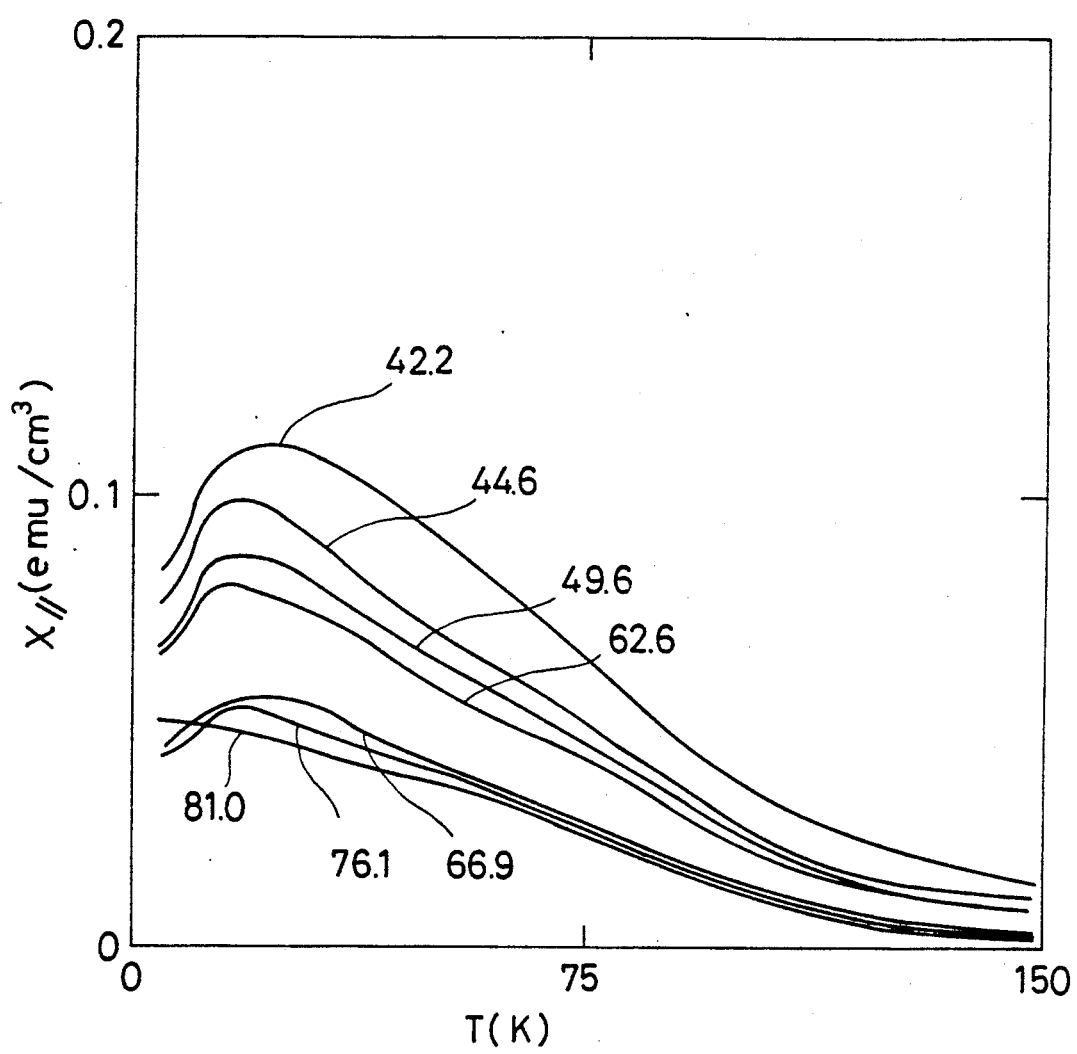
FIG. 11 is a graphical representation of Mn-thickness dependency of the spin-glass characteristic of an Eu-Mn magnetic thin film, plotted for different Mn-layer thickness (in Å).

Next, the spin-glass characteristic is investigated for the different thickness of the Eu layers and the Mn layers, with the result shown in FIG. 10. In this figure the ordinate is the Mn layer thickness and the abscissa ia the Eu layer thickness, and x's indicate the points where no spin-glass character is observed, while o's indicate the points where spin-glass characteristic is observed. It may be seen from this result, for at least Eu-Mn magnetic thin film, that the spin-glass characteristic may be obtained for the Eu layer thickness equal to or less than 40 Å and Mn layer thickness equal to or less than 70 Å, and that the spin-glass characteristic appears more intensely for less Mn layer thickness as shown in FIG. 11, which is advantageous for magnetic recording. To note, the ordinate is the magnetization in unit of emu per unit gram, and the abscissa, the absolute temperature, the parameter being Mn layer thickness (in Å).

The reason why the Eu and Mn layer thickness may be less than 40 Å and less than 70 Å, respectively, and why thinner Mn layers are more advantageous is due to the fact that the spin-glass characteristic arises from the interaction between the Eu layers mediated by the conduction electrons which are free from the influence of the magnetic spins in the Eu layers (indicating that the interlayer material (between the Eu layers) should be a conductive material), so that the spin-glass characteristic is weakened as the Mn layers become thick loosing the interlayer interactions. It is also anticipated that this view applies not only to Eu-Mn magnetic thin film but also to aforementioned magnetic thin film of a rare-earth and a conductive material. Further, rare-earth metals are known to possess conduction electrons which exist independently of the magnetic spins. Therefore, although the invention has been shown above with reference to a magnetic thin film comprising Mn layers 2 and Eu layers 3, it should be understood that the invention is not limited to this magneto-optical recording medium and may be carried out by alternative multilayer film of a rare-earth metal and a conductive material layers stacked alternately on each other.

In this manner it is possible to manufacture low-cost magnetic films having spin-glass characteristics using rather inexpensive material such as Eu and without using expensive Tb (terbium). Such magnetic films have a perpendicular magnetization property which permits recording and erasing information by means of laser light. The magnetic films may be thus utilized as high-density recording media.

It is inferred that conventional magnetic materials having spin-glass characteristic such as (1) $Au_xFe_{1-x}$, (2) $Eu_xSr_{1-x}S$, (3) $Fe_xAl_{1-x}$, (4) $Fe_xCr_{1-x}$, (5) $Fe_xPd_{1-x}$, (6) $Mn_xPd_{1-x}$, (7) $Pd_xFe_yMn_{1-x-y}$, (8) $Ni_xMn_{1-x}$, (9) $Fe_xNi_{1-x}$, (10) $Fe_xMn_{1-x}$, (11) $Zn_xCo_{1-x}$, and (12) $Co_xTi_{1-x}O_4$ may be also utilized as a magnetic material to obtain similar functions described above.

I claim:

1. A magneto-optical recording medium having a spin-glass characteristic, comprising:

a substrate; and magnetic media for enabling recording and erasing of information therein, said magnetic media having an alternatively stacked plurality of layers of a rare-earth metal and a conductive material which are stacked on said substrate, said magnetic media having an essentially nonreversible spin-glass characteristic and being free from being ferromagnetic.

2. A magneto-optical recording medium as set forth in claim 1, characterized in that said rare-earth metal layers have thickness less than 40 Å and said conductive material layers have thickness less than 70 Å.

3. A magneto-optical recording medium as set forth in claim 1, wherein said magnetic media has first, second and third levels of magnetism respectively at first, second and third temperatures when said magnetic media is heated from said first temperature to said second temperature and then to said third temperature, said first temperature being room temperature, said second temperature being lower than said third temperature and greater than said first temperature, said third level of magnetism being peak for said magnetic media, said spin-glass characteristic of said magnetic media enabling retention by said magnetic media of said second level of magnetism after said magnetic media is heated from said first temperature to said second temperature and is thereafter cooled back to said first temperature instead of being heated further, said spin-glass characteristic of said magnetic media enabling restoration by said magnetic media of said first level of magnetism after heating said magnetic media to a fourth temperature that is higher than said third temperature and thereafter cooling said magnetic media to said first temperature, said magnetic media having a level of magnetism at said fourth temperature that is greater than that at said first temperature and less than that at said third temperature.

4. A magneto-optical recording medium as set forth in claim 1, wherein said magnetic media includes europium and manganese as said layers.

* * * * *